United States Patent [19]

Wesner

[11] 4,398,353

[45] Aug. 16, 1983

[54] COMPASS DATA CONVERTER

[75] Inventor: Charles R. Wesner, Crozet, Va.

[73] Assignee: Sperry Corporation, New York, N.Y.

[21] Appl. No.: 318,702

[22] Filed: Nov. 6, 1981

[51] Int. Cl.³ .................. G01C 17/26; G06F 15/20
[52] U.S. Cl. ........................... 33/363 R; 33/363 Q; 364/559
[58] Field of Search ............... 33/312, 317 R, 363 R, 33/363 K, 363 L, 363 N, 363 Q; 364/559

[56] References Cited

U.S. PATENT DOCUMENTS

| | | | |
|---|---|---|---|
| 3,720,866 | 3/1973 | Avellar et al. | 364/559 |
| 3,906,483 | 9/1975 | Fowler | 33/363 K |
| 3,975,621 | 8/1976 | Fowler | 364/559 |
| 4,067,007 | 1/1978 | Bryden | 33/363 R |
| 4,163,326 | 8/1979 | Edwards | 364/559 |
| 4,179,741 | 12/1979 | Rossani | 364/559 |

Primary Examiner—Richard R. Stearns
Attorney, Agent, or Firm—Howard P. Terry

[57] ABSTRACT

The peaks of synchro or step data representative of compass heading are detected and the resulting logic levels are latched into a register by an enable pulse generated in response to the data itself. Three outputs from the register are fed directly to the computer input port and provide 1/6° resolution and 1° range. Two of the register outputs are decoded and used to operate an up/down counter. The output of the counter is applied to the computer input port and provide 1° resolution and 16° range.

5 Claims, 4 Drawing Figures

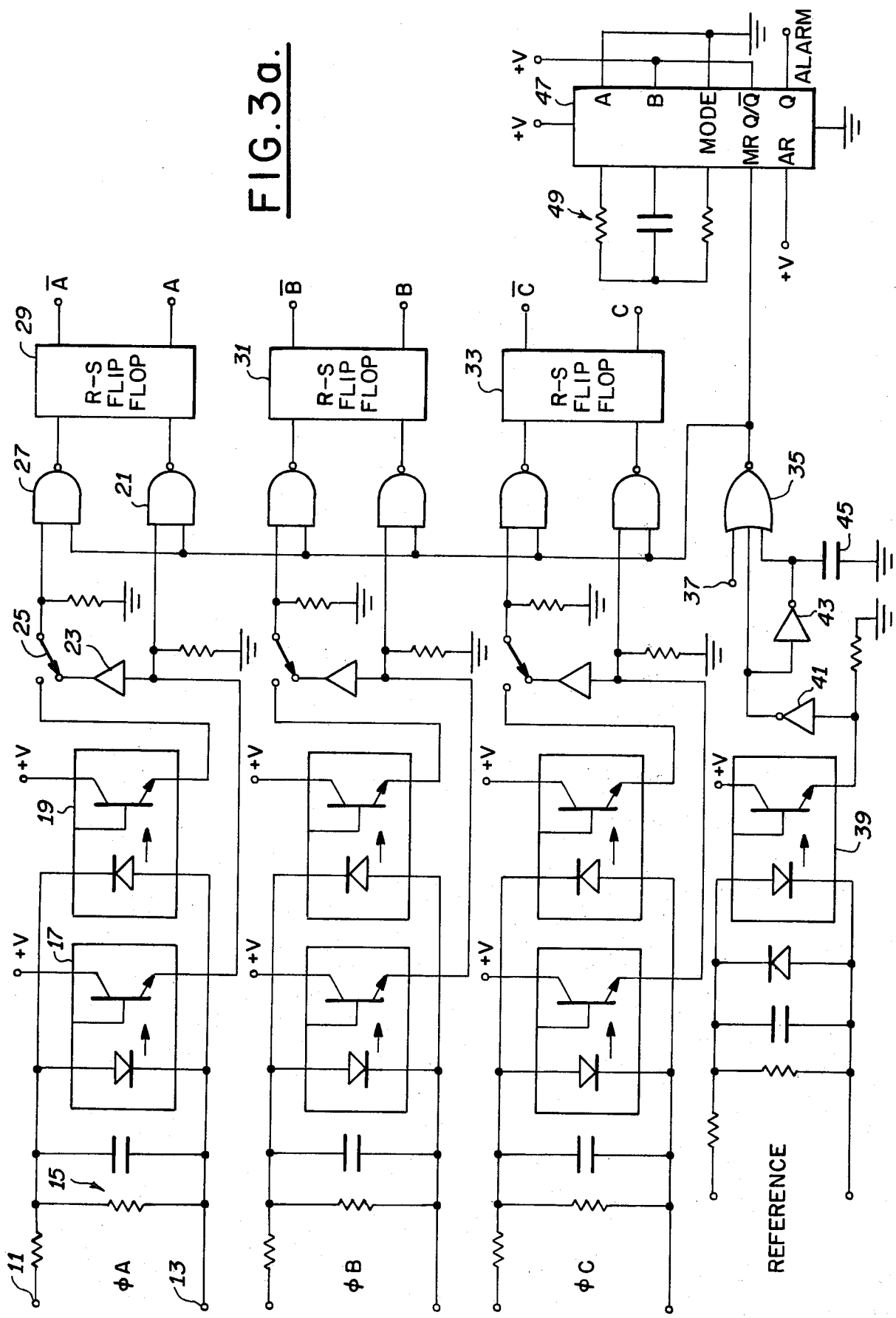

COMPASS DATA CONVERTER

BACKGROUND OF THE INVENTION

1. Field of the Invention

The invention relates to Compass Systems and more specifically to Compass Data Converters used in such system.

2. Description of the Prior Art

Compasses installed in nautical and aeronautical craft frequently employ electrical sensors such as synchro or "step data generators" to develop electrical signals indicative of the compass reading. The electrical signals are converted to a suitable form for actuating a remote display.

Prior art compass data converters ordinarily are suitable with only synchros or with step data generators but cannot be used with both types of sensors.

Furthermore, the prior art systems are subject to noise induced in the data lines which can result in false operation.

SUMMARY OF THE INVENTION

According to the principles of the present invention, compass data either in synchro or step data form is converted into three logic level signals and applied to the input port of a digital computer so as to provide high resolution throughout a 1° range. In addition, a pair of the logic level signals are decoded and operate an up/down counter whose output is also applied to the input port so as to accommodate cumulative compass changes in either direction.

BRIEF DESCRIPTION OF THE DRAWINGS

FIGS. 3a and 3b are diagrams illustrating a circuit embodying the principles of the invention.

DESCRIPTION OF THE PREFERRED EMBODIMENT

Figure 1:
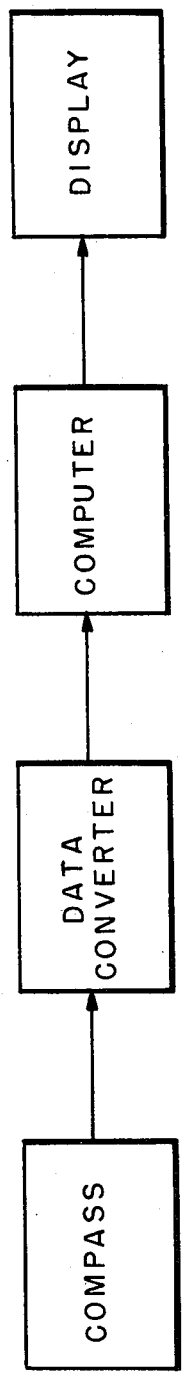
FIG. 1 is a block diagram illustrating the manner in which the data converter of the present invention is used in a compass system.

FIG. 1 is a block diagram which illustrates in a general way, the manner in which the data converter of the present invention is disposed in a typical compass system. Electrical output signals in either synchro form, in which the synchro rotates 360° for each 1° change in compass headings, or in step data form, are generated by the compass and applied to the data converter. The data converter operates on these signals, as will be described, and applies the converted signals in a suitable form to a conventional computer which is programmed to provide suitable signals to a desired type of electrical display.

Figure 2:
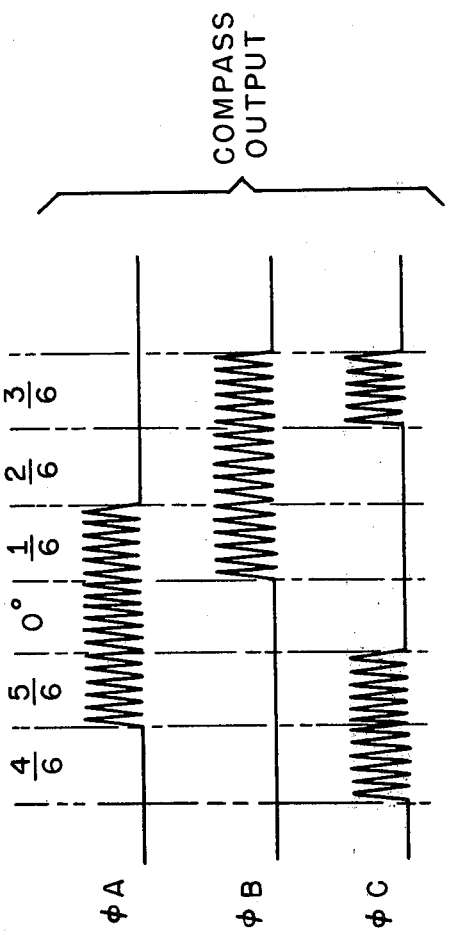
FIG. 2 is a graphical representation useful in explaining the step data mode of operation of the invention.

FIG. 2 represents typical electrical signals generated by a compass in a step data system. The compass produces three phase-displaced pulse trains. As the compass heading changes, a train of modulated pulses appears at each phase output terminal. The modulated pulses in the various trains are phase displaced with respect to each other as indicated in FIG. 2. Normally, the compass output circuits are constructed so that a modulated pulse exists through a ½° variation in compass heading and the inter-pulse interval is equal to the modulated pulse width. As can be seen in FIG. 2, when the compass angle is slightly greater than 0°, high voltages will be produced in phase A and phase B, whereas no voltage will appear in phase C. As the compass heading moves below 0°, the phase C voltage rises to a high level so that a high voltage is produced in phases A and C.

It will also be noted from FIG. 2 that the combination of voltages in the three phases changes for each 1/6° of compass heading change.

As is well known in synchro systems, the three data voltages can be used to provide pulse trains having the same phase relationship as those depicted for the step data pattern of FIG. 2.

The input portion of the circuit of the invention is depicted in FIG. 3a. Three data channels are connected to receive the phase A, phase B, and phase C pulse trains, respectively, from the synchro or step data sources.

The reference channel is energized from the source of transmitter rotor voltage in the case of a synchro system. In the case of a step data system, each of the data channels is sampled so that a reference voltage is available at all times regardless of the compass heading. In either case, the reference voltage consists of a pulse train whose individual pulses are in phase with the pulses appearing in the pulse trains in the three data channels.

It will be noted from FIG. 3a, that the three data channels are structurally identical so that a description of channel A will apply to channel B and C as well.

The phase A data input is fed to a pair of terminals 11 and 13 and applied across an RC network 15 which serves to filter out high frequency transients, but does not interfere with the individual pulses constituting the data pulse train.

The output of the filter is applied to first and second commercially available light-coupled isolators 17 and 19 which respond to voltage pulses of opposite polarity. As is known in the art, such isolators contain a light emitting diode which responds to a voltage of a given polarity and a light responsive transistor which is switched to a conducting state when the diode is actuated.

The output of the isolator 17 is applied to a first terminal of a NAND logic gate 21 and through a voltage inverter 23 and a mode selector 25 to one input terminal of a second NAND logic gate 27.

The output of the light-coupled isolator 19 is applied through a second input terminal of a mode selector 25 to the same input terminal of the NAND gate 27.

The mode selector 25, which has been shown for convenience as a single-pole double-throw switch, is placed in the upper position when the circuit of the invention is to be used in a system employing synchro voltages and in the lower position when the circuit is to be used in a compass system employing step data signals. In actual practice, the common output terminal of the mode selector is permanently wired to the appropriate upper or lower input terminal when the circuit of the invention is installed in a particular compass system.

The NAND gates 21 and 27 serve to set or reset a flip flop 29 when a particular NAND gate is actuated by a data pulse from one of the light-coupled isolators and an enabling pulse from the reference channel.

The flip flop 29 together with the corresponding flip flops 31 and 33 in the B and C channels constitute a register capable of providing suitable voltages to the computer input port as will be explained.

When the data converter of the invention is to be used in a step data system, the mode selector 25 is placed in the lower position.

A NOR gate 35 in the reference channel provides enable pulses that permit the flip flops to be switched in accordance with appropriate data in the various data channels. The NOR gate includes a first input terminal 37 which is connected to receive a programmed low level data clock enable signal when information is to be read into the register. When information is to be read out of the register, a high level signal is applied to the terminal 37 so as to disable this gate and thus prevent the flip flops in the register from being switched while the status of the register is being determined.

Reference signals are applied to the enabling gate 35 through a light-coupled isolator 39. The output signal from the isolator 39 is applied to a second terminal of the NOR gate 35 through a first inverter 41. The output of the inverter 41 is also applied to a second inverter 43 which is connected to a third input terminal on the gate 35 and coupled to ground through a capacitor 45.

When a reference pulse of a proper polarity is applied to the isolator 39, the transistor in that isolator conducts and applies a high voltage to the inverter 41 so as to produce a low voltage at the second input terminal of the NOR gate 35. At the same time, the low level output voltage from the inverter 41 is applied to the inverter 43 which permits the capacitor 45 to charge from its initial low voltage state. After a predetermined time, the charge on the capacitor 45 reaches a high level, thus disabling the gate 35. Effectively, the inverters 41 and 43 cooperate with the capacitor 45 to provide a timing means that produces a high level trigger pulse of predetermined duration at the output of the gate 35. The same pulse is used to actuate an alarm circuit which provides a warning when an inordinate delay occurs between successive output pulses from the gate 35. As presently preferred, the warning system includes a timing module 47 in the form of a commercially available integrated circuit ship such as a Motorola catalog No. 14541 integrated circuit chip. Such a chip has been indicated in the accompanying figure for convenience in describing the invention. Such chips can be "programmed" by applying appropriate voltages to various terminals on the chip and by selecting an appropriate resistor-capacitor combination 49 to provide a circuit that will yield a desired time interval. In a typical application, the timing module is programmed to provide an output signal after a 30 millisecond delay between output pulses from the NOR gate 35. It will be appreciated that numerous types of timing modules may be substituted for the particular integrated circuit chip described although this particular chip has proven to be well suited for the intended purpose.

The output signals from the A, B, and C terminals of the three flip flops in the register consist of rectangular-wave pulse trains representative of the modulated pulse trains applied to the three data channels.

Figure 3B:
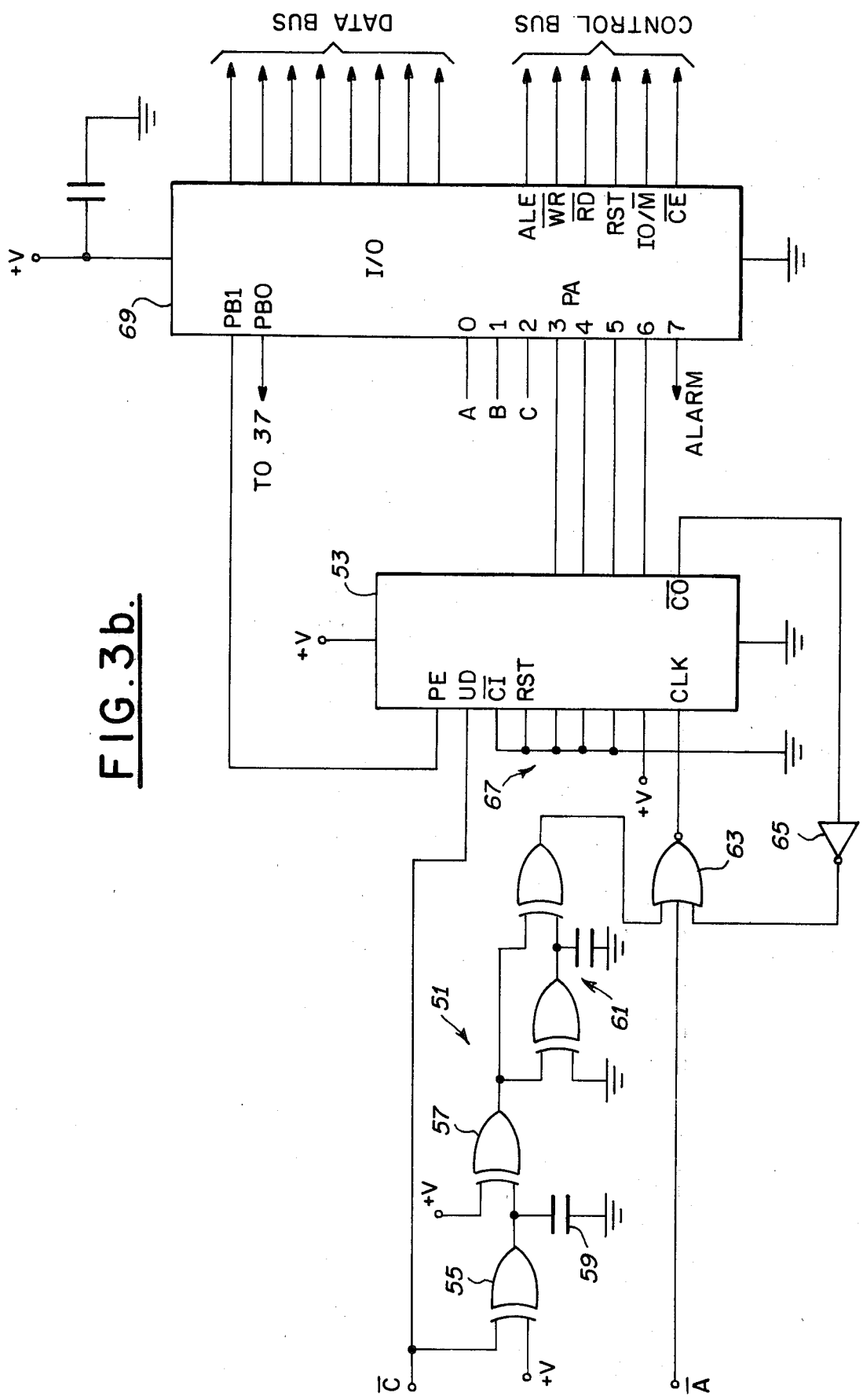

The $\bar{A}$ and $\bar{C}$ output signals from the flip flops 29 and 33 are applied through a pulse generating network 51 of exclusive OR gates to a 4 bit up/down counter 53 as depicted in FIG. 3b.

In general, the pulse generator 51 serves to generate a clock pulse to trigger the counter 53 each time that the compass heading passes through the 0° reading. The 4 bit counter keeps track of the number of degrees of net change in compass heading since the previous reading.

Although any one of various commercially available counters is suitable for the purpose, a Motorola catalog No. 14,516 counter is presently preferred and such a counter is indicated in FIG. 3b as a matter of convenience.

Although a wide variety of suitable pulse generators will be known to those skilled in the art, the array of exclusive OR gates depicted in FIG. 3 is presently preferred for this purpose. When the state of the $\bar{C}$ signal changes, the output of the gate 55 is reversed. However, this reversal is delayed before being passed on to the gate 57 by the time required to adjust the charge on capacitor 59 to the new level. The change in level is reversed by the gate 57 and again delayed by the capacitor 61. The 4 bit counter 53 requires a high level clock pulse from the NOR gate 63 which requires that all inputs to the gate 63 be at a low level. Thus a clock pulse is applied to the 4 bit counter 53 when the $\bar{A}$ signal is at a low level. The inverted count out signal from the inverter 65 is at a low level and the pulse from the pulse generator switches to a low level.

The $\bar{C}$ signal serves to initiate the delayed signal and is also applied to the up/down terminal of the 4 bit counter so as to determine the direction in which the counter will respond when triggered by the accompanying clock pulse.

Referring again to FIG. 2, it can be seen that when the compass heading approaches 0°, the phase A voltage is at a high level, so that $\bar{A}$ is at a low level. Furthermore, as the compass heading increases through 0°, the C signal decreases from a high to a low level, and when the compass heading decreases through zero degrees, the C signal changes from a low to a high level.

The 4 bit counter 53 includes an up/down input terminal and counts in a direction determined by the level of a voltage applied to that terminal. Because the clock pulse is delayed by the action of the pulse generator 51, a clock pulse serves to increase or decrease the count existing in the counter depending upon the voltage level of the $\bar{C}$ signal when the clock pulse occurs. In this way, the count increases for one direction of compass heading change and decreases for the opposite direction of compass heading change.

A counter 53 is programmed by standard techniques to be preset to a count of 8 by connecting the reset terminal, the count-in terminal, and appropriate preset input terminals as indicated by the conductor 67 in FIG. 3b. Because of this feature, the counter can count in either direction, depending upon the nature of the $\bar{C}$ input signal until a count-out signal disables gate 63 to prevent overflow. The counter is preset to 8 after each read by I/O port 69.

The four bit output from the counter is applied to a standard input/output port 69. As presently preferred, the input/output port is a commercially available INTEL I/O port, catalog number 8155, and this particular device has been indicated in the drawing for the sake of convenience. It will be appreciated, however, that various other input/output ports may be used if desired. Such devices are commonly constructed in the form of integrated circuit chips and in such devices all of the appropriate ports on the chip can be configured as inputs or outputs by standard software design techniques.

As depicted in FIG. 3b, the A, B, and C terminals of the three flip flops in the register (FIG. 3a) as well as the four output lines from the four bit counter 53 are connected to the input terminals of the I/O port. Terminal PA 7 is connected to the Q output terminal of the timing module 47 and is programmed to actuate a suitable alarm in response to the appearance of a data clock alarm signal at the Q output terminal when the timing module senses that an inordinate delay has occurred between successive enabling pulses from the gate 35, thus indicating failure in the compass system. Typically, audio or visual alarms may be actuated in response to such an alarm signal.

The terminal PB1 of the I/O chip is connected to the "parallel enable" terminal of the up/down counter 53 and programmed to provide a signal that presets the counter when fresh information is to be read into that device.

The PBO terminal of the I/O chip is connected to the input terminal 37 of the enabling gate 35 and programmed to provide a low level voltage to that gate when information is to be read into the register.

As indicated in FIG. 3b, appropriate output terminals are coupled through a control bus to the computer which is programmed in accordance with standard techniques to read information into or out of the computer by means of a data bus. The computer itself is also programmed to provide output signals suitable for energizing a selected type of display. Such displays may, for instance, be standard digital or analog displays.

In operation, the circuit is first connected to operate in the synchro or step data mode. Assume for purposes of explanation, the circuit is to be used with a compass providing a step data output. The common terminals in the mode selector means are connected to the lower input terminals as depicted in FIG. 3a so as to receive the inverted outputs from the respective light-coupled isolators. Assume now, that a high level, modulated step data signal is being received from phase A. The high level signal will pass through the isolator 17 and be applied to the NAND gate 21. If a low level data clock enable signal is being received at terminal 37 of the NOR gate 35, so as to permit information to be read into the register, a short duration enabling pulse will be formed in the reference channel so as to enable the gate 21 and set the flip flop so as to produce a high level output signal at the terminal A. If a low level data signal is received from phase A when the enabling pulse occurs, this low level signal will be inverted in gate 23 and applied through the NAND gate 27 so that a low level A signal will be derived from the flip flop 29. At the same time, the flip flops 31 and 33 will respond to the level of the data signals in phases B and C respectively. These A, B, and C signals are applied directly to input terminals on the I/O port 69.

As the compass heading changes, the various flip flops in the register will be switched in response to enabling pulses for 1/6° of compass heading change.

When the compass heading passes through 0°, a low level $\overline{A}$ signal is applied to the NOR gate 63 and the $\overline{C}$ signal switches states in a manner dependent upon the direction of compass heading change. Assuming the system is in a mode wherein information can be read into the four bit counter 53, the counter will increase or decrease by a value of one when the delayed pulse produced by the pulse generator 51 reaches a low level at the input to the gate 63.

When information is to be read out of the counter 53, a high level signal is applied to terminal 37 of gate 35 which prevents flip flops 29, 31 and 33 and counter 53 from changing. Information can be read out of the counter 53 and through the I/O port to the computer by means of the data bus.

The circuit of the present invention is highly immune to noise, since the only time that the flip flops in the register can be changed is during the occurrence of the short duration enabling pulses. Therefore, noise occurring in the data lines does not affect the state of the flip flops unless it happens to occur during the short time period in which an enabling pulse is being generated.

Furthermore, the circuit of the present invention monitors the occurrence of enabling pulses and provides means for alerting an operator to the fact that there has been an interruption in service.

While the invention has been described in its preferred embodiments, it is to be understood that the words that have been used are words of description rather than of limitation and that changes within the purview of the appended claims may be made without departing from the true scope and spirit of the invention in its broader aspects.

I claim:

1. A compass data converter for use in synchro and step data compass systems having three channels, comprising means to receive modulated pulse trains representative of the instantaneous compass heading reference means for providing enabling pulses synchronized with said modulated pulse trains, register means, gating means responsive to said enabling pulses for switching said register means in accordance with the instantaneous data in each of said three channels, timing means for providing an alarm signal when the time interval between successive enabling pulses exceeds a predetermined value, input/output means, means to apply the output of said register means to said input/output means, counter means, coupled to said register means and said input/output means, to count the number of degrees of net change in compass headings between successive readings, means to apply the output of said counter means to said input/output means, said input/output means being programmed to read information into and out of an external computer.

2. The compass data converter of claim 1 further characterized in that the means to receive modulated pulse trains includes three input data channels, each of said channels including first and second light-coupled isolators responsive to positive and negative input pulses respectively, each of said channels further including mode selection means for preparing the converter to respond either to synchro input signals or to step data input signals.

3. The compass data converter of claim 2 further characterized in that said register means includes three flip flops, each responsive to the signals appearing in a different one of said data input channels, and in that said gating means includes an individual pair of logic gates for setting and resetting each one of said flip flops.

4. The compass data converter of claim 3 further characterized in that the mode selection means in each channel includes the means for connecting the first and second of said light-coupled isolators in that channel to first and second logic gates respectively in the same channel when the converter is to be used in a synchro system.

5. The compass data converter of claim 3 further characterized in that said mode selection means in each channel includes means for connecting one of said light-coupled isolators directly to one of said logic gates and through a voltage inverter to the other of said logic gates in the same channel when the converter is to be used in a step data system.

* * * * *